US007212499B2

(12) United States Patent
Hoffmann et al.

(10) Patent No.: US 7,212,499 B2
(45) Date of Patent: May 1, 2007

(54) METHOD AND APPARATUS FOR ANTENNA STEERING FOR WLAN

(75) Inventors: John E. Hoffmann, Indialantic, FL (US); George Rodney Nelson, Jr., Merritt Island, FL (US); John A. Regnier, Palm Bay, FL (US); Kevin P. Johnson, Palm Bay, FL (US)

(73) Assignee: IPR Licensing, Inc., Wilmington, DE (US)

( * ) Notice: Subject to any disclaimer, the term of this patent is extended or adjusted under 35 U.S.C. 154(b) by 23 days.

(21) Appl. No.: 10/675,563

(22) Filed: Sep. 30, 2003

(65) Prior Publication Data

US 2004/0114535 A1 Jun. 17, 2004

Related U.S. Application Data

(60) Provisional application No. 60/414,946, filed on Sep. 30, 2002.

(51) Int. Cl.
*H04L 12/26* (2006.01)
(52) U.S. Cl. .............. 370/252; 370/349; 370/352; 370/252; 370/465; 455/562.1
(58) Field of Classification Search .......... 343/702, 343/700 MS; 370/252, 349, 352, 465, 469, 370/368
See application file for complete search history.

(56) References Cited

U.S. PATENT DOCUMENTS 6,195,045 B1 2/2001 Xu et al.

| 6,445,688 | B1 | 9/2002 | Garces et al. |
| 6,907,229 | B2* | 6/2005 | Shpak ................ 455/69 |
| 2001/0028639 | A1 | 10/2001 | Eikelenboom et al. |
| 2001/0031648 | A1 | 10/2001 | Proctor, Jr. et al. |
| 2002/0187813 | A1 | 12/2002 | Guo |
| 2003/0048770 | A1* | 3/2003 | Proctor, Jr. .............. 370/349 |
| 2003/0146876 | A1* | 8/2003 | Greer et al. ............. 343/702 |
| 2004/0017793 | A1* | 1/2004 | Thermond et al. ........ 370/338 |

* cited by examiner

*Primary Examiner*—Tho Phan
*Assistant Examiner*—Chuc Tran
(74) *Attorney, Agent, or Firm*—Volpe & Koenig, P.C.

(57) ABSTRACT

A Station Management Entity (SME) steers a directional antenna for a station to communicate with an Access Point (AP) in an 802.11 protocol system. The SME can steer the antenna before or after an 802.11 station has authenticated and associated with the Access Point. During a passive scan, the steering process cycles through the available antenna positions and monitors an AP beacon signal to determine a best position based on, for example, a Received Signal Strength Indication (RSSI). During an active scan where access probing is used, the steering process cycles through the antenna positions and monitors a probe response to determine the best antenna position. Additional scans may be performed based on a decision that the received signal level of the currently selected antenna position has dropped below a predetermined threshold.

26 Claims, 11 Drawing Sheets

METHOD AND APPARATUS FOR ANTENNA STEERING FOR WLAN

RELATED APPLICATION(S)

This application claims the benefit of U.S. Provisional Application No. 60/414,946, filed Sep. 30, 2002, the entire teachings of which are incorporated herein by reference.

BACKGROUND OF THE INVENTION

The 802.11 Institute of Electrical and Electronic Engineers (IEEE) standards defines a specification for stations to be moved within a facility and remain connected to a Wireless Local Area Network (WLAN) via Radio Frequency (RF) transmissions to Access Points (AP) connected to a wired network. A physical layer in the stations and access points controls the modulation and signaling format used by the stations and access points to communicate. Above the physical layer is a Medium Access Control (MAC) layer that provides services such as authentication, deauthentication, privacy, association, disassociation, etc.

In operation, when a station comes on-line, the physical layer in the station and access points first establish wireless communication with each other, followed by the MAC layer establishing access to the network via an access point.

Typically, in 802.11 stations or access points, the signals are RF signals, transmitted and received by monopole antennas. A monopole antenna provides transmissions in all directions generally in a horizontal plane. Monopole antennas are susceptible to effects that degrade the quality of communication between the station and access points, such as reflection or diffraction of radio wave signals caused by intervening walls, desks, people, etc., multipath, normal fading, Rayleigh fading, and so forth. As a result, efforts have been made to mitigate signal degradation caused by these effects.

A technique known as "antenna diversity" counteracts the degradation of RF signals. Antenna diversity uses two antennas that are connected to a transmitter/receiver via an antenna diversity switch. The theory behind using two antennas for antenna diversity is that, at any given time, one of the two antennas is likely receiving a signal that is not affected by the effects of, say, multi-path fading. The system using the two antennas selects the unaffected antenna via the antenna diversity switch.

SUMMARY OF THE INVENTION

Using antenna diversity techniques, signal degradation caused by multi-path fading or other effects that reduce RF signal quality can be improved by selecting the diversity antenna that is receiving the RF signal at a higher strength. However, each of the diversity antennas is an omni-directional antenna (e.g., monopole antenna), so the system employing the antenna cannot steer the antenna away from a source of interference or achieve any gain beyond what one omni-directional antenna inherently provides.

It would be better if a station or access point using an 802.11 protocol were to use a directional antenna to improve system performance.

Accordingly, the principles of the present invention provide a technique for steering a directional/multi-element antenna in an 802.11 protocol system for a station to communicate with the Access Point (AP) in an Extended Service Set (ESS) network or other network structure having wireless access points. This approach has minimal impact on network efficiency as the approach can be accomplished within the current 802.11 protocols. Unless otherwise specified, a reference herein to this "802.11 protocol" or "802.11 standard" includes the 802.11, 802.11a, 802.11b, and 802.11g protocols and standards.

In one embodiment, the technique can come into operation before and after an 802.11 station has authenticated and associated with a network access point connected to a wired network. The wired network is referred to interchangeably herein as a distribution system. It is assumed that the initial antenna scan is accomplished within the Medium Access Control (MAC) layer. During a passive scan, the steering process cycles through the available antenna positions and monitors a signal metric associated with a beacon signal or other predetermined signal to determine a best antenna pointing direction. During an active scan where access probing is used, the process cycles through the antenna positions and monitors a signal metric associated with a probe response signal to determine the best antenna position.

Once the station has authenticated and associated with the network, additional scans may be performed, optionally based on a determination that the received signal level has dropped below some threshold.

A directional antenna in a wireless local area network (WLAN) environment results in improved range and data rates for users and increases network efficiency for the network.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1A:
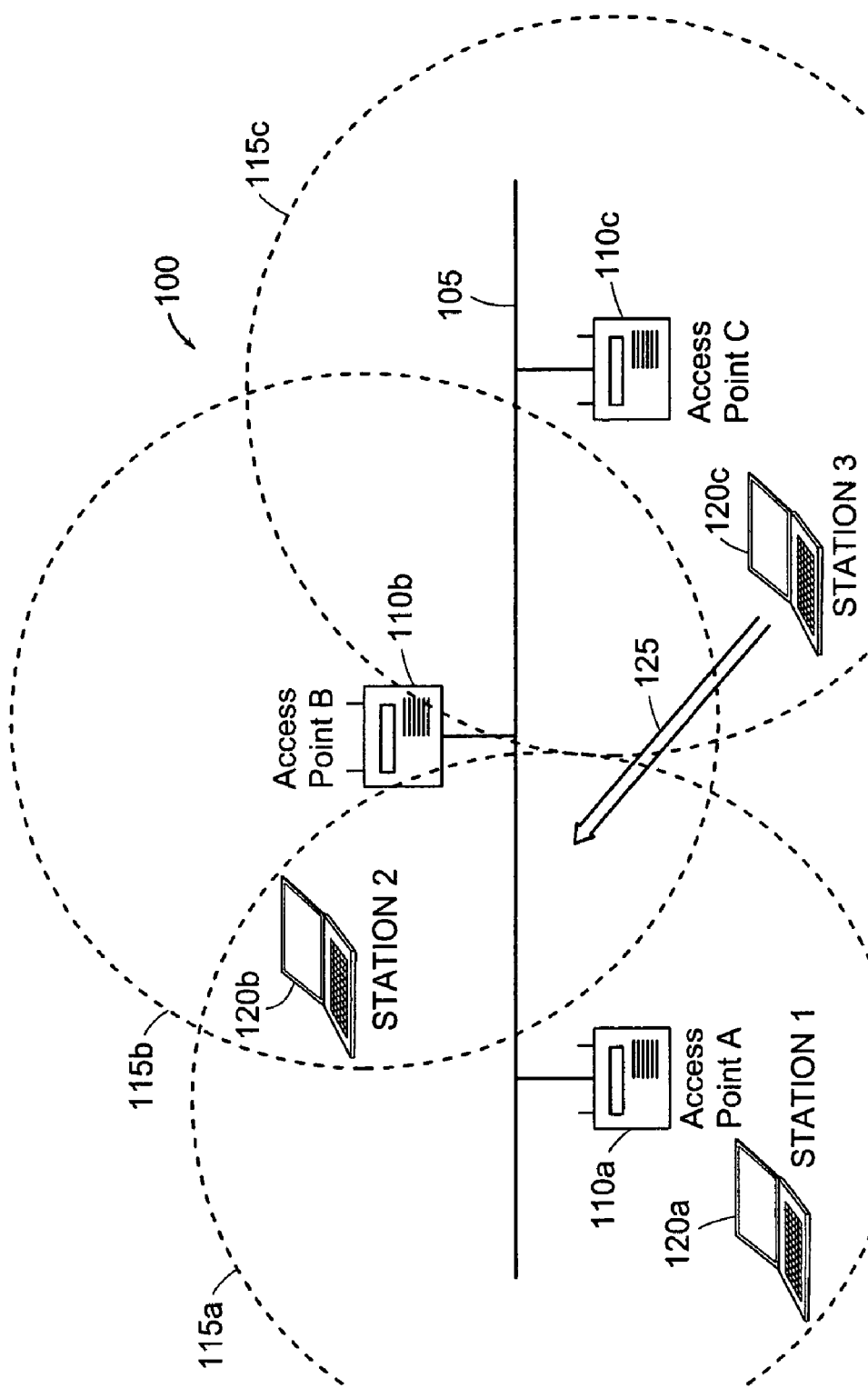
FIG. 1A is a schematic diagram of a wireless local area network (WLAN) employing the principles of the present invention.

FIG. 1A is a block diagram of a wireless local area network (WLAN) 100 having a distribution system 105. Access points 110a, 110b, and 110c are connected to the distribution system 105 via wired connections such as wired Local Area Networks (LANs). Each of the access points 110 has a respective zone 115a, 115b, 115c in which it is capable of transmitting and receiving RF signals to and from stations 120a, 120b, and 120c, which are supported with Wireless Local Area Network (WLAN) hardware and software to access the distribution system 105.

Figure 1B:
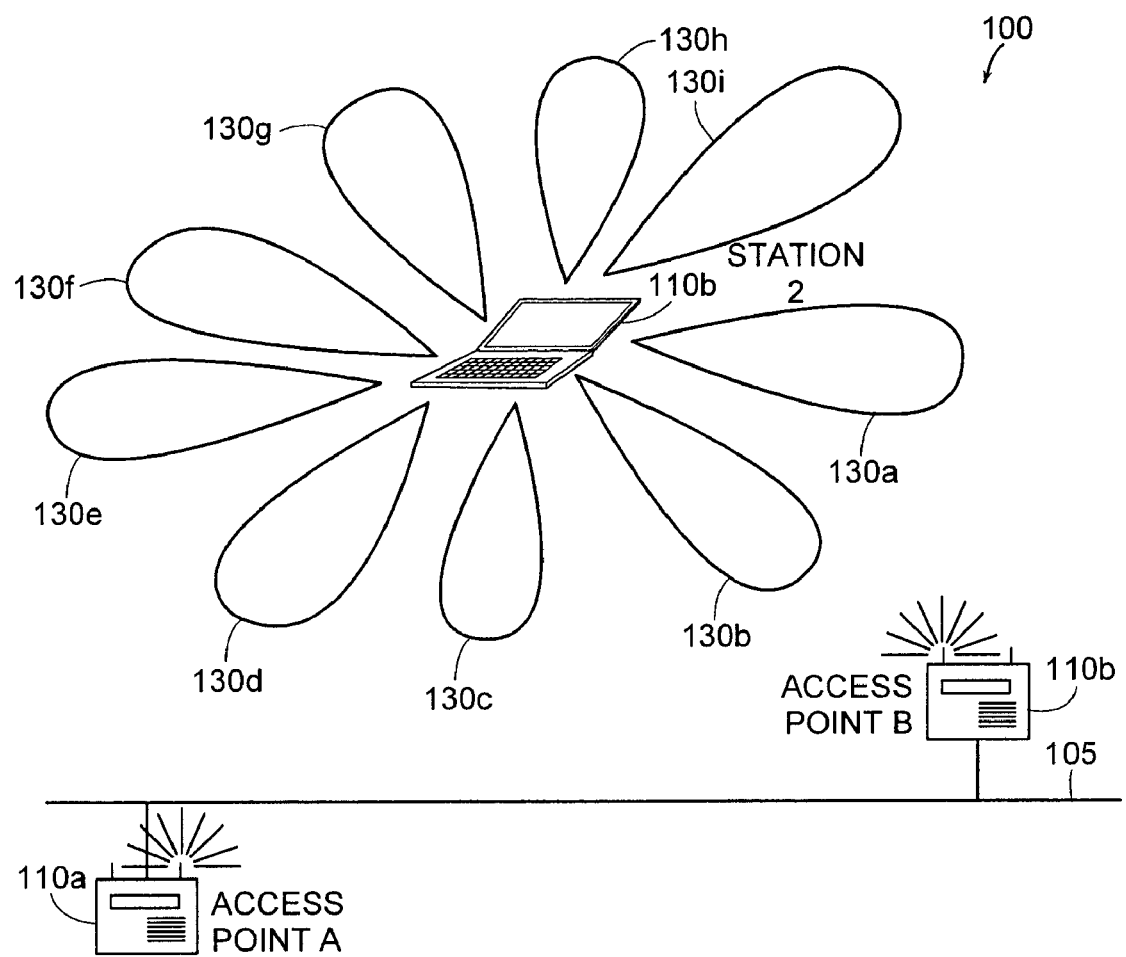
FIG. 1B is a schematic diagram of a station in the WLAN of FIG. 1A performing an antenna scan.

FIG. 1B is a block diagram of a subset of the network 100 in which the second station 120b, employing the principles of the present invention, is shown in more detail. The second station 120b generates directive antenna lobes 130a–130i (collectively, lobes 130) from a directive antenna array. The directive antenna array is interchangeably referred to herein as a directional antenna. As discussed in detail beginning in reference to FIG. 2A, the second station 120b uses the directive antenna array to scan its environment to determine a direction to a "best" access point 110a, 110b.

The scan may be performed in a passive mode, in which the second station 120b listens for beacon signals emitted by the access points 110a, 110b. In 802.11 systems, the beacon signals are generally sent every 100 msec. So, for the nine antenna lobes 130, the process takes about 1 second to cycle through the antenna lobe directions and determine the best angle.

In an active scan mode, the second station 120b sends a probe signal to the access points 110a, 110b and receives responses to the probe signal from the access points 110a, 110b. This probe and response process may be repeated for each antenna scan angle.

Continuing to refer to FIG. 1B, during either a passive or an active scan, the second station 120b uses the directive antenna array to scan the RF airways in search of signals from the access points 110. At each scan direction, the second station 120b measures the received beacon signal or probe response and calculates a respective metric for that scan angle. Examples of the metrics include Received Signal Strength Indication (RSSI), Carrier-to-Interference ratio (C/I), Signal-to-Noise ratio (Eb/No), or other suitable measure of the quality of the received signal or signal environment. Based on the metrics, the second station 120b can determine a "best" direction to communicate with one of the access points 110a, 110b.

The scans may occur before or after the second station 120b has authenticated and associated with the distribution system 105. Thus, the initial antenna scan may be accomplished within the Medium Access Control (MAC) layer. Alternatively, the initial scan may be accomplished external from the MAC layer. Similarly, scans occurring after the second station 120b has authenticated and associated with the distribution system 105 may be accomplished within the MAC layer or by processes occurring external from the MAC layer.

Figure 2A:
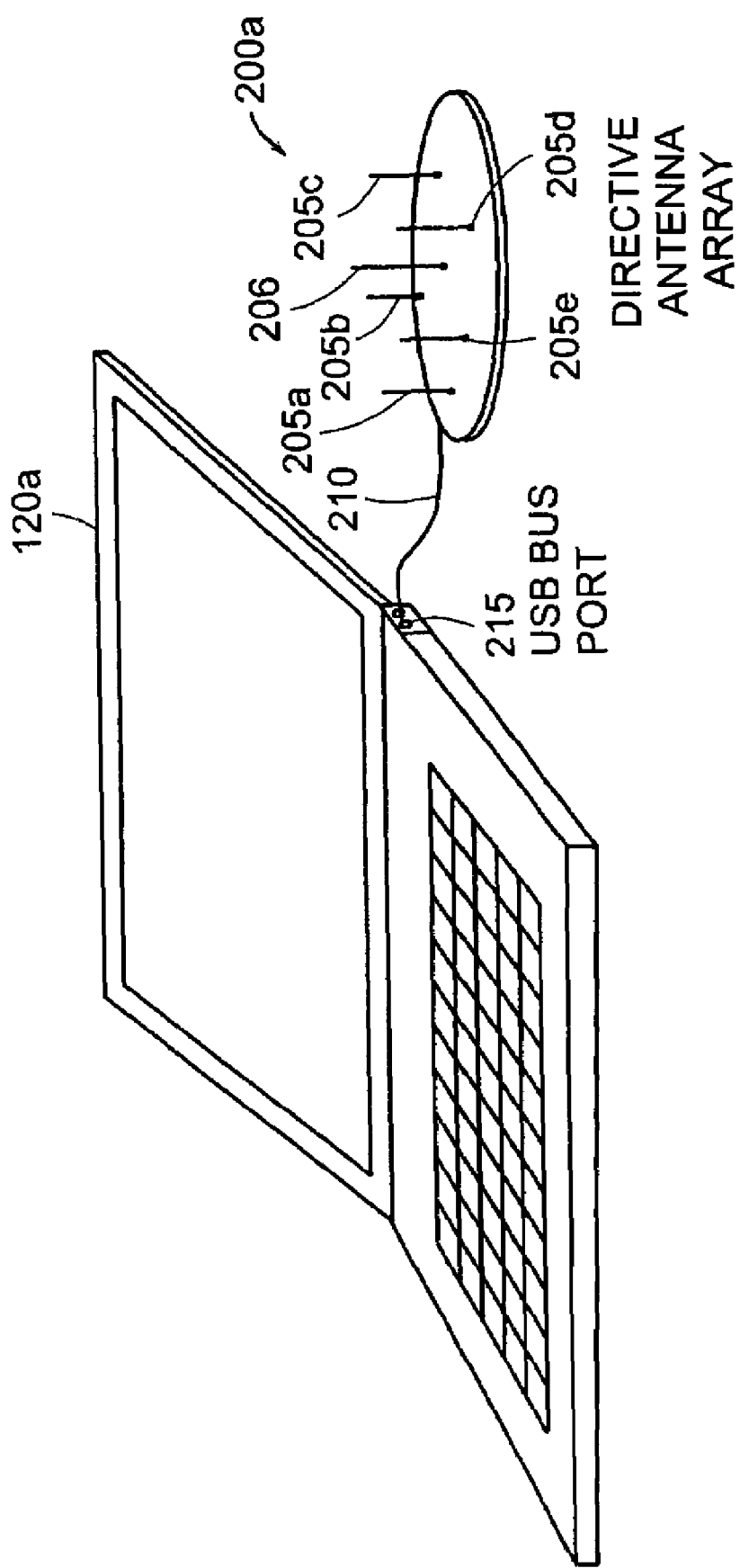
FIG. 2A is an isometric view of a station of FIG. 1A having an external directive antenna array.

FIG. 2A is a diagram of the first station 120a that is equipped with a directive antenna array 200a. In this embodiment, the directive antenna array 200a is external from the chassis of the first station 120a.

The directive antenna array 200a includes five monopole passive antenna elements 205a, 205b, 205c, 205d, and 205e (collectively, passive antenna elements 205) and one monopole, active antenna element 206. The directive antenna element 200a is connected to the first station 120a via a Universal System Bus (USB) port 215.

The passive antenna elements 205 in the directive antenna array 200a are parasitically coupled to the active antenna element 206 to facilitate beam angle direction changes. Changing the beam angle direction may allow for at least one antenna beam to be rotated 360° in increments associated with the number of passive antenna elements 205. Less than full 360° rotations and sub-incremental direction changes are also possible.

In some embodiments, the directive antenna array 200a supports an omni-directional mode defined by an omni-directional or substantially omni-directional antenna pattern (not shown). The stations 120 may use the omni-directional antenna pattern for Carrier Sense prior to transmission or to assess by way of comparison current performance of directional mode versus omni-directional mode. In an 'ad hoc' network, the stations 120 may revert to an omni-only antenna configuration since communicating with other stations 120 can occur in any direction.

Figure 2B:
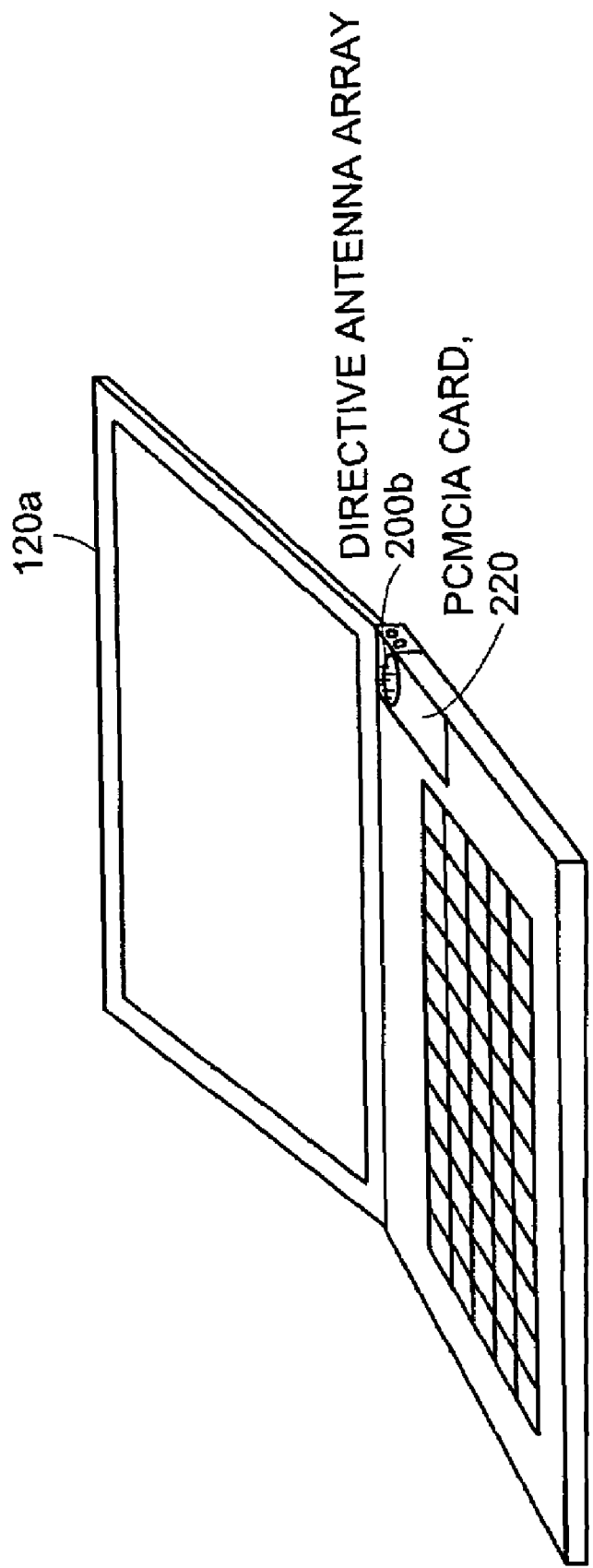
FIG. 2B is an isometric view of the station of FIG. 2A having the directive antenna array incorporated in an internal PCMIA card.

FIG. 2B is another embodiment of the first station 120a that includes a directive antenna array 200b deployed on a Personal Computer Memory Card International Association (PCMCIA) card 220. The PCMCIA card 220 is disposed in the chassis of the first station 120a in a typical manner. The PCMCIA card 220 communicates with a processor (not shown) in the first station 120a via a typical computer bus. The directive antenna array 200b deployed as the PCMCIA card 220 provides the same functionality as the stand-alone directive antenna array 200a discussed above in reference to FIG. 2A.

It should be understood that various other forms of directional antennas can be used. For example, the directive antenna arrays 200b may include one active antenna element electromagnetically coupled to multiple passive antenna elements. In another embodiment, the directive antenna arrays 200 may include multiple active and multiple passive antenna elements. In yet another embodiment, the directive antenna arrays 200 may include multiple active antenna elements and a single passive antenna element. In still a further embodiment, the directive antenna arrays 200 may include all active antenna elements.

Figure 3A:
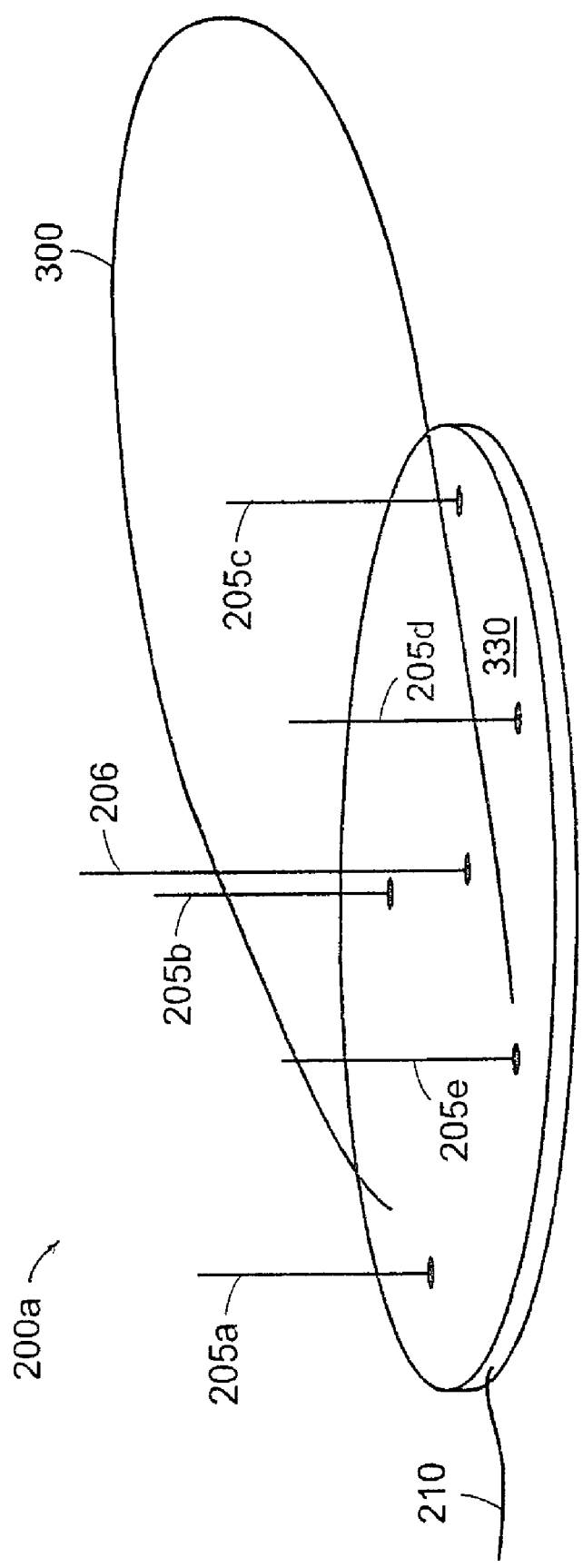
FIG. 3A is an isometric view of the directive antenna array of FIG. 2A.

FIG. 3A is a detailed view of the directive antenna array 200a that includes the multiple passive antenna elements 205 and one active antenna element 206 as discussed above in reference to FIGS. 2A and 2B. As shown in this detailed view, the directive antenna array 200a may also include a ground plane 330 to which the passive antenna elements 206 are electrically connected.

In operation, one state of the directive antenna array 200a provides a directive antenna lobe 300 angled away from antenna elements 205a and 205e. This is an indication that the antenna elements 205a and 205e are in a "reflective" mode, and the antenna elements 205b, 205c, and 205d are in a "transmissive" mode. In other words, the mutual coupling between the active antenna element 206 and the passive antenna elements 205 allows the mode settings of the passive antenna elements 205 to control the direction of the directive antenna lobe 300. As should be understood, different mode combinations result in different antenna lobe 300 patterns and angles.

Figure 3B:
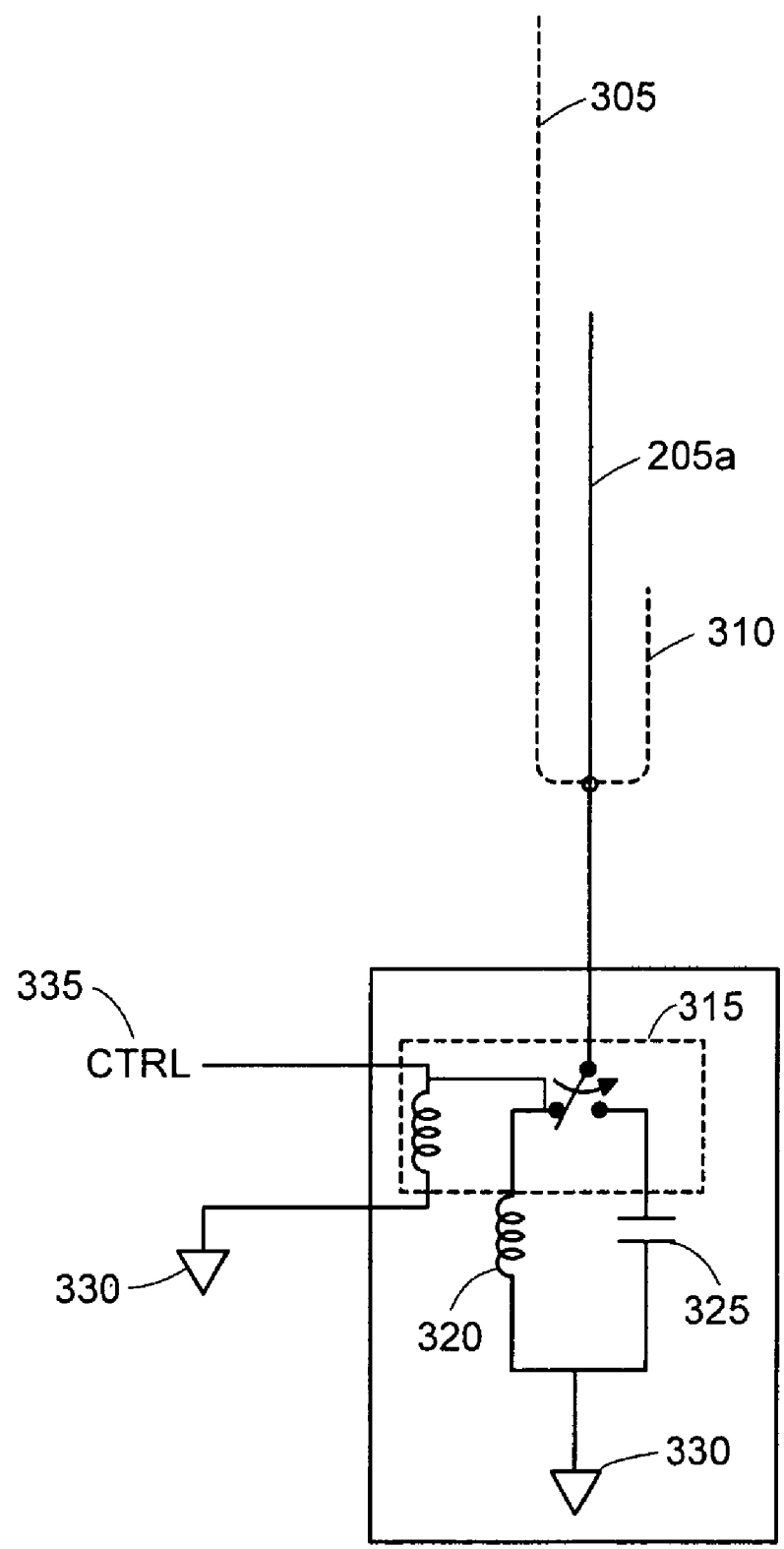
FIG. 3B is a schematic diagram of a switch used to select a state of an antenna element of the directive antenna of FIG. 3A.

FIG. 3B is a schematic diagram of an example circuit that can be used to set the passive antenna element 205a in a reflective or transmissive mode. The reflective mode is indicated by a representative "elongated" dashed line 305, and the transmissive mode is indicated by a "shortened"

dashed line 310. The representative dashed lines 305 and 310 are also representative of the electrical termination associated with the passive antenna element 205a. For example, electrically connecting the passive antenna element 205a to a ground plane 330 via an inductive element 320 sets the passive antenna element 205a in reflective mode, and electrically connecting the passive antenna element 205a to the ground plane 330 via a capacitive element 325 sets the passive antenna element 205a in transmissive mode.

Electrically connecting the passive antenna element 205a through the inductive element 320 or capacitive element 325, or, more generally, a reactive element, may be done via a switch 315. The switch 315 may be a mechanical or electrical switch capable of electrically connecting the passive antenna element 205a to the ground plane 330 or reactive element in a manner suitable for this application. The switch 315 is set via a control signal 335 in a typical switch control manner.

In the case of the directive antenna array 205a of FIG. 3A, both passive antenna elements 205a and 205e are connected to the ground plane 330 via respective inductive elements 320. At the same time, in the example of FIG. 3A, the other passive antenna elements 205b, 205c, and 205d are electrically connected to the ground plane 330 via respective capacitive elements 325. Capacitively coupling all of the passive elements 325 causes the directive antenna array 200a to form an omni-directional antenna beam pattern.

It should be understood that other electrical terminating devices may also be used between the passive antenna elements 205 and ground plane 330, such as delay lines and lumped impedances.

Now that a brief introduction of the 802.11 protocol and directional antenna operation has been discussed, a detailed discussion of steering a directional antenna through use of a Station Management Entity (SME) and the 802.11 protocol is presented below.

Figure 8:
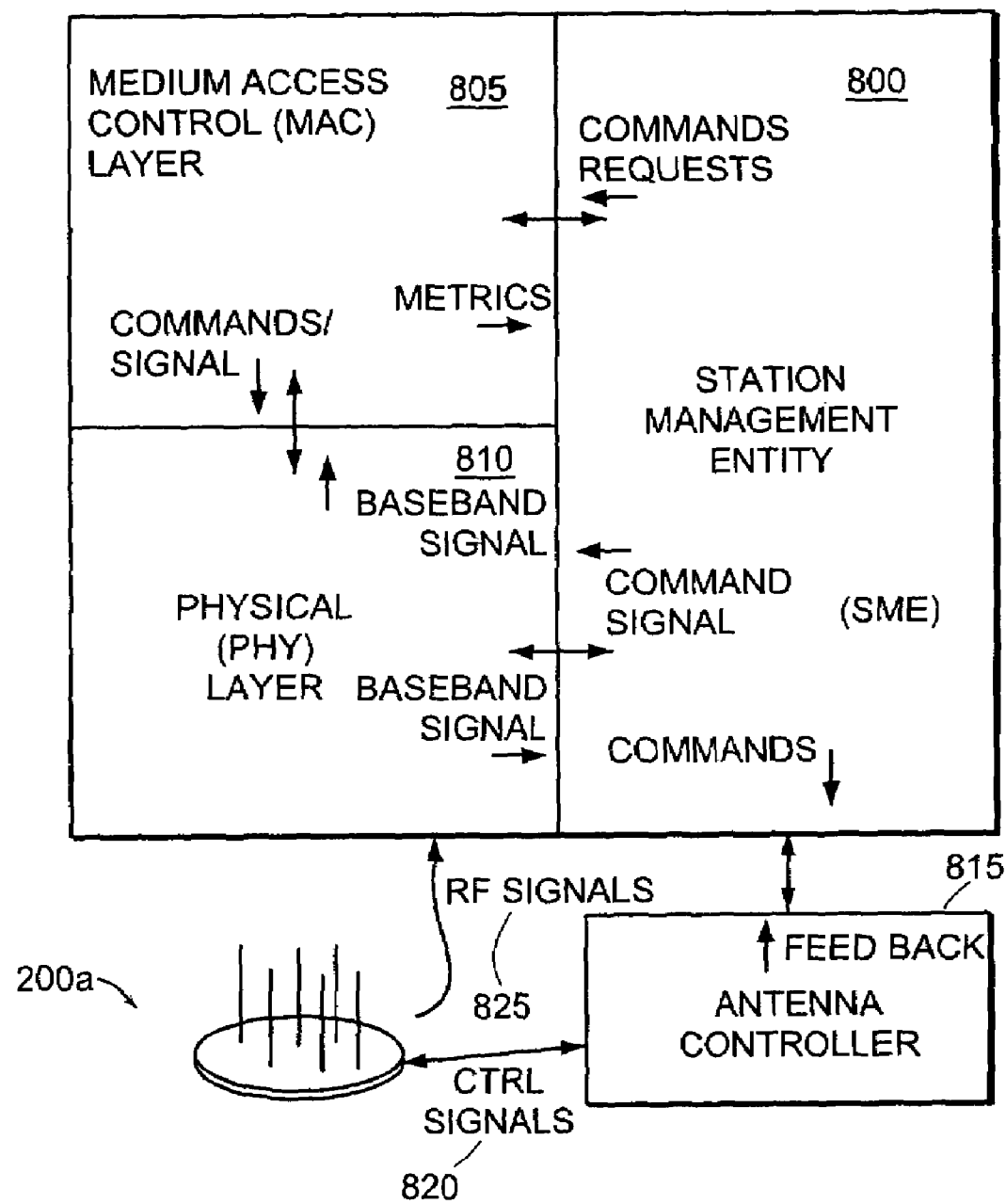
FIG. 8 is a diagram of software and hardware elements executing in the station of FIG. 2A.

Referring now to FIG. 8, a SME 800, MAC layer 805, and physical (PHY) layer 810 are shown in a generalized arrangement, sometimes referred to as an 802.11 stack. In this arrangement, the SME 800 is in communication with the MAC layer 805 and PHY layer 810. The SME 800 is a layer-independent entity that may be viewed as a separate management plane or residing "off to the side" from the MAC layer 805 and PHY layer 810. The SME 800, MAC layer 805, and PHY layer 810 may communicate through various media, such as via a system bus, physical cable interconnection, or network connection. For example, the SME 800 may be a standalone software application or applet executing in a personal computer that is being used as a station 120a, as described above. The MAC layer 805 and PHY layer 810 may be implemented in software or firmware operating in a plug-in PCI or PCMCIA card 220 installed in the station 120a. In this embodiment, the MAC layer 805 and PHY layer 810 use standard protocols in accordance with the 802.11 standards. In this way, the SME 800 can be downloaded from a server on the Internet (not shown), for example, and be capable of interacting with the MAC layer 805 and PHY layer 810 in a plug-and-play manner.

The SME 800 may be partially or fully updated on occasion to facilitate updating or exchanging the directive antenna array 205a with an antenna array having a different configuration. The SME 800 may include an interface driver (not shown). The interface driver is sometimes included as part of the SME 800 while other times provided as a separate module. The interface module can send commands to an antenna controller 815 and receive feedback from the antenna controller 815. The commands cause the directive antenna array 205a to steer an antenna beam during a scan when searching for a "best" access point 110.

In accordance with the 802.11 standard, the MAC layer 805 can determine signal metrics, such as signal-to-noise ratio, associated with RF signals communicated via the directive antenna 205a or other form of antenna. The MAC layer 805 employs the PHY layer 810 to convert and RF signal to a baseband signal, and vice-versa. The MAC layer 805 can use the PHY layer 810 to provide signal-related parameters, such as Received Signal Strength Indication (RSSI), Signal Quality (SQ), and indicated data rate. The MAC layer 805 may then provide the metrics to the SME 800 in the form of a datum associated with one antenna beam direction or a table of data associated with multiple antenna beam directions. The SME 800 may cause the MAC layer 805 to provide the metrics through use of commands or requests.

In operation, the SME 800 may cause the MAC layer 805 to provide metrics associated with respective beam angles of the directive antenna array 205a. Based on the metrics and predetermined criteria, the SME 800 may steer the directive antenna array 205a to a selected direction associated with an access point 110.

In a passive scan embodiment, the MAC layer 805 may be caused to determine the metrics as a function of received RF energy by the directive antenna array 205a in the respective beam angles. For example, the metrics may be higher for signal strength of a beacon signal received from a first access point 110a as compared to signal strength of a beacon signal received from a second access point 110b. In an active scan embodiment, the SME 800 may cause the MAC layer 805 (i) to transmit a signal via the physical layer 810 to at least one access point 110a, 110b, or 110c and (ii) to measure a response from the access point(s) 110.

The MAC layer 805 may also provide the metrics or table of metrics to the SME 800 based on previously calculated or measured metrics. For example, a periodic or event-driven event may cause the MAC layer 805 to determine the metrics and provide the metrics to the SME 800 on an "as needed," "as requested," or predefined basis. The station 120a may associate with the distribution system via the access point 110, and the MAC layer 805 may provide the metrics to the SME 800 before or after the associating with the distribution system, optionally in a pre-selected manner.

The SME 800 may issue commands to the antenna controller 815, which sends control signals 820 to the directive antenna array 205a. The control signals 820 may change the state of connection to reactances 320, 325 associated with the antenna elements 205 in the directive antenna array 200a, which, in turn, causes the antenna beam angle to change. The SME 800 may coordinate this action with causing the MAC layer 805 to provide the metrics associated with the antenna beam angles. For example, the SME 800 may command the directive antenna array 200 to steer its antenna beam from angle to angle in a step-and-hold manner while concurrently commanding the MAC layer 805 to measure the signal strength in a corresponding wait-and-measure manner until a metric is associated with each access point 110 at each antenna beam angle.

Based on the metrics, the SME 800 may issue further commands to the antenna controller 815 to steer the antenna beam in a direction associated with an access point 110. For example, the antenna beam may be steered to point directly toward an access point 110a or in the direction of a stronger multi-path that is associated with the same access point 110*a*. In this way, the SME 800 can use the best path for associating the station 120*a* with the selected access point 110*a*.

The SME 800 may invoke an omni-directional beam angle by the directive antenna array 205*a* on a predetermined, event-driven, or random basis to determine whether the selected antenna beam direction is still the most suitable direction for communicating with the access point 110*a*. The metrics may correspond to beam angles relative to one access point 110*a* or multiple access points 110*a*, 110*b*.

When scanning (i.e., searching) for a best access point 110 with which to associate, the SME 800 may command or request the MAC layer 805 to return metrics for multiple beam angles and multiple beacon signals. When determining whether a different antenna beam direction would provide an improved communications path, the SME 800 may perform a re-scan. The re-scan may be performed during an idle period (i.e., no data transmission or reception is occurring), or the re-scan may be "woven-in" during non-idle periods, in which case unused or predefined overhead bits or bytes may be used for transmitting/receiving signals to be measured or transmitting probe requests.

In one embodiment, the SME 800 can scan for (i) a best beam direction to a predetermined access point or (ii) a best beam direction to a non-predetermined access point. In either case, the SME 800 may cause (i.e., command or request) the MAC layer 805 to return metrics or a table of metrics for multiple beam angles and at least one beacon signal. After selecting the best beam direction based on the metrics or table of metrics, the SME 800 steers the antenna beam of the directive antenna array 205*a* in the selected direction through techniques discussed above in reference to FIGS. 3A and 3B.

Figure 4:
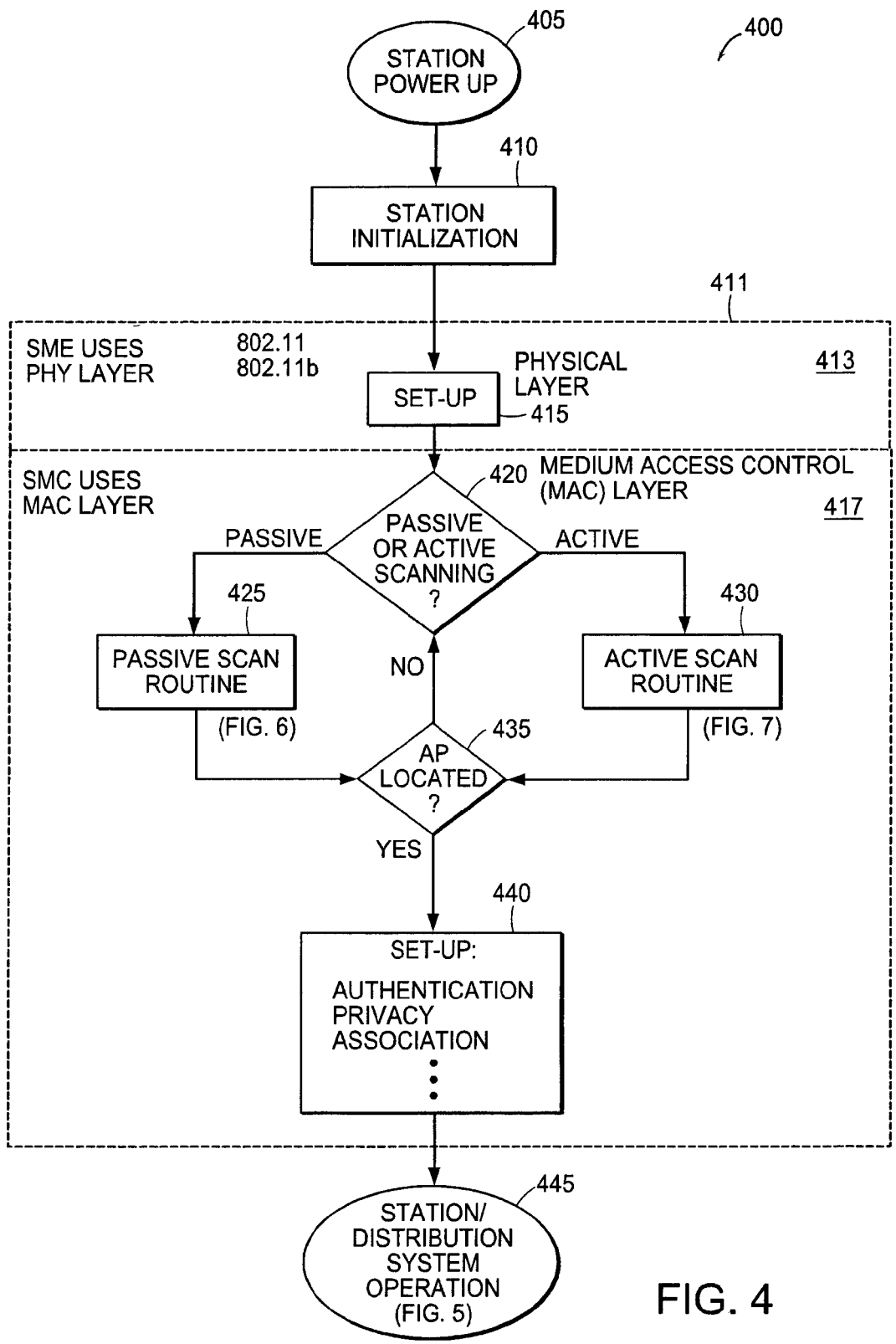
FIG. 4 is a flow diagram of a first process used by a station of FIG. 1.

FIG. 4 is a flow diagram of a process 400 executed by the stations 120 according to the principles of the present invention for use in the WLAN 100 (FIG. 1B). The process 400 may be an embodiment of a subset of SME 800 commands executed by a processor in the station 120.

The process 400 begins in step 405 in which the station 120 is powered up. In step 410, the station 120 goes through an initialization process. At some point following station initialization 410, the process 400 enters into a routine 411 that executes commands that communicate with the MAC and physical layers of the 802.11 protocol. The routine 411 communicates first (step 413) with the physical layer and second (step 417) with the MAC layer 417.

The physical layer communications (step 413) includes a set-up 415, where initialization and communication processes occur at the physical layer of the 802.11 protocol. Other processes occurring at the physical layer may also occur at this stage of the process 400.

Figure 6:
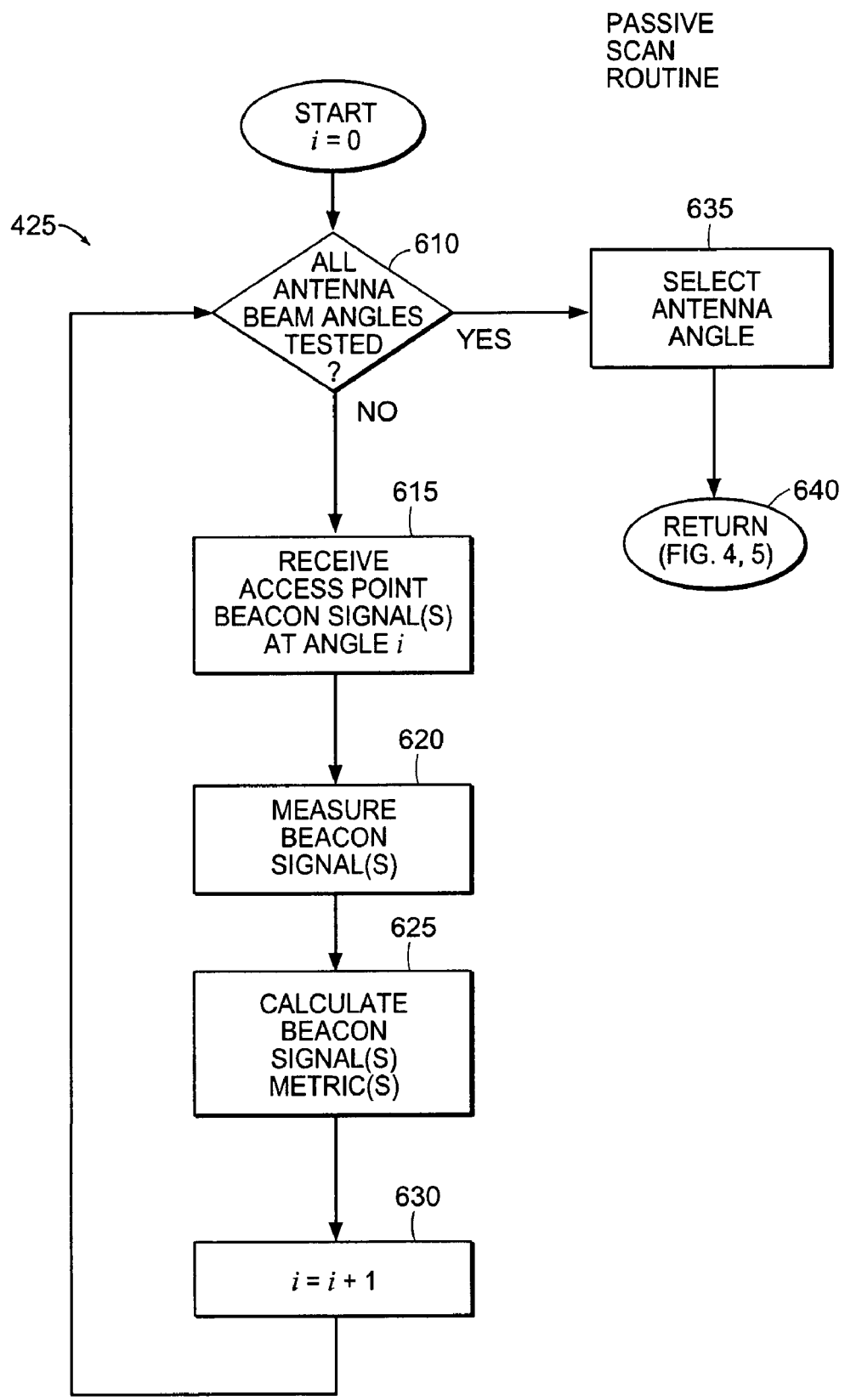
FIG. 6 is a flow diagram of a passive scan routine used by the processes of FIGS. 4 and 5.
Figure 7:
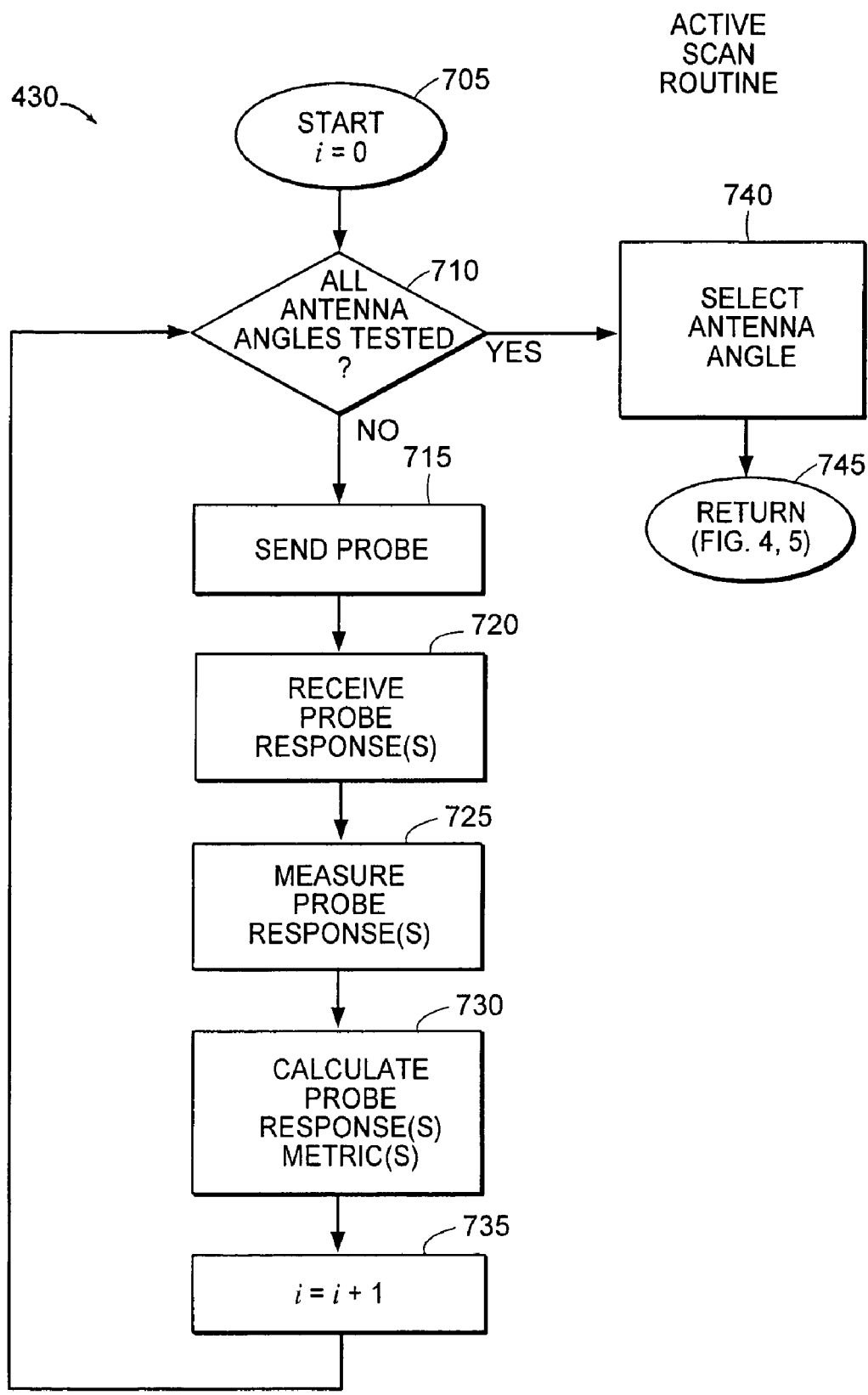
FIG. 7 is a flow diagram of an active scan routine used by the processes of FIGS. 4 and 5.

In the MAC layer communications (step 417), the process 400 continues with first determining whether passive or active scanning is to be used (Step 420) by the station 120 to determine a "best" antenna pointing angle. If passive scanning is to be used, the process 400 continues in a passive scan routine 425 (FIG. 6). If an active scanning is to be used, the process 400 continues at an active scan routine 430 (FIG. 7). Following the passive or active scan routines, the process 400 continues (step 435) by determining whether an access point 110 has been located by the selected scan routines 425 or 435.

If an access point 110 has not been located, the process 400 continues to scan (steps 420–430) for an access point 110 until reaching a predetermined timeout, in which case omni-directional mode is used as a default. If an access point 110 has been located, the process 400 continues at a set-up process (step 440), which again employs the MAC layer 417. The set-up process (step 440) may include performing authentication, privacy, association, and so forth as defined by the 802.11 protocol. Following set-up (step 440), the process 400 continues with a station/distribution system operation process 445 (FIG. 5).

Figure 5:
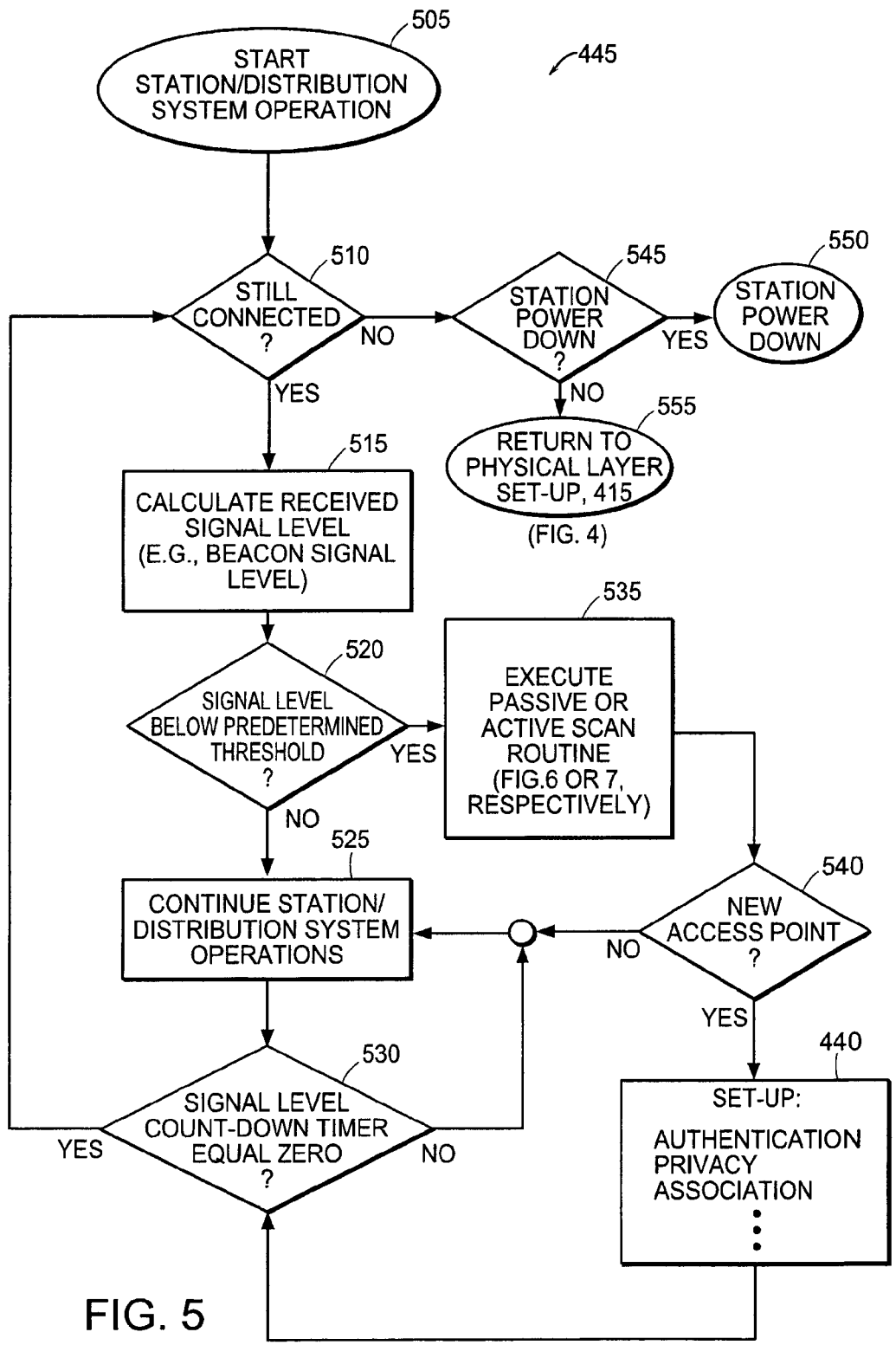
FIG. 5 is a flow diagram of a second process used by a station of FIG. 1.

FIG. 5 is a flow diagram of the station/distribution system operation process 445, which is executed in the stations 120 at the SME 800 level. The process 445 includes typical operations occurring within the station 120*a* and supports interfacing between the station 120*a* and the distribution system 105 via an access point 110. The process 445 may also reassess the antenna beam direction to determine a "best" direction. Reassessing the antenna beam direction may be performed on (i) a periodic basis, (ii) when the level of a received signal or other signal quality metric falls below a predetermined threshold, or (iii) based on other event driven or non-event driven criteria. The example discussed herein is based on a count-down timing model executed on the first station 120*a*.

Continuing to refer to FIG. 5, the process 445 begins in step 505. In step 510, the process 445 determines whether the station 120 is still connected to the distribution system 105. If the station 120*a* is connected, then, in step 515, the process 445 calculates a received signal level. In step 520, the process 445 determines whether the signal level is below a predetermined threshold. If the signal is not below the predetermined threshold, the process 445 continues in step 525 in which the station and distribution system operations continue.

In step 530, the process 445 determines whether a signal level count-down timer is equal to zero. If the signal level count-down timer equals zero, the process 445 loops back to step 510 to determine whether the station 120*a* is still connected to the distribution system 105 via respective access point 110*a*. If the signal level count-down timer does not equal zero, the process 445 continues at step 525. The count-down timer may be re-initialized in a typical manner at an appropriate stage of the process 445, such as step 510.

If the signal level is determined to be below the predetermined threshold in step 520, the process 445 continues in step 535 to execute the passive scan routine 425 (FIG. 6) or active scan routine 435 (FIG. 7). Following execution of one of the routines, the process 445 continues in step 540, in which a determination is made as to whether the station 120 has selected to access the distribution system 105 through a new access point 110. If no change is made to the access point 110*a*, the process 445 continues at step 525. If a new access point has been selected, the process 445 continues at step 440 in which authentication, privacy, and association steps are performed at the MAC level of the 802.11 protocol, as discussed above.

If the station 120*a* is no longer connected to the distribution system 105 via an access point 110 (e.g., user directed station power down, out-of-range, etc.), the process 445 continues at step 545 to determine whether the station 120*a* has been powered down by a user. If the station 120*a* has not been powered down, the process 445 continues at step 555, which returns to the physical layer set-up (step 415) of FIG. 4. Returning to the physical layer set-up (step 415) occurs in this embodiment based on an assumption that a communication error or out-of-range error has interrupted communications between the station 120*a* and selected access point 110. If the station 120*a* has been powered down, the operation 445 continues at step 550 to power down the station 120*a* in a typical manner.

FIG. 6 is a flow diagram of the passive scan routine 425 introduced in FIG. 4. The passive scan routine 425 starts in step 605 in which a counter i is set to zero. In step 610, the routine 425 determines whether all antenna angles have been tested. If not all antenna angles have been tested, the routine 425 continues in step 615 in which the station 120a receives access point beacon signal(s) at angle i. In other words, the antenna angle is set to angle i to listen for the beacon signal(s). In step 620, the beacon signal(s) is/are measured. In step 625, the passive scan routine 425 calculates beacon signal(s) metric(s). In step 630, the counter i is incremented to select the next angle supported by the directive antenna array 200a (FIG. 2). The routine 425 continues in step 610 and repeats until all antenna beam angles have been tested.

Following testing of all antenna beam angles, the routine 425 continues in step 635, in which the routine 425 selects an antenna angle that is a "best" angle at which to communicate with an access point 110. Selection of the angle can be made according to any number of criteria, including RSSI, C/I, Eb/No, or other signal quality measure commonly known in the art. The passive scan routine 425 returns to the calling routine (FIG. 4 or 5) in step 640 for continued processing.

FIG. 7 is a flow diagram of the active scan routine 430 introduced in FIG. 4. The active scan routine 430 begins in step 705, in which a counter i is set equal to zero. In step 710, the routine 430 determines whether all antenna angles have been tested. If no, then the routine 430 continues in step 715.

In step 715, the routine 430 sends a probe via RF signal using the directive antenna array 200a to the access point(s) 110. The routine 430 receives probe response(s) in step 720 from the access point(s) 110. In step 725, the active scan routine 430 measures the probe response(s). In step 730, the active scan routine 430 calculates metric(s) of the probe response(s). In step 735, the counter i is incremented to test the next antenna angle.

After repeating the process for all antenna angles, in step 740, the active scan routine 430 selects the antenna angle that provides the best or most suitable signal quality between the station 120a and access point 110. In step 745, the active scan routine 430 returns to the calling process of FIG. 4 or 5.

The methods and apparatus used to practice the embodiments discussed above may be used in 802.11 networks or other wireless networks, such as a Bluetooth network.

The processes of FIGS. 4–8 may be implemented in software, firmware, or hardware. In the case of software, the software may be stored on any type of computer-readable medium, such as ROM, RAM, CD-ROM, or magnetic disc. Storage may be local to the station 120 or downloadable via a wired or wireless network, such as the distribution system 105 via access points 110. The software may be loaded and executed by a general purpose processor or application-specific processor.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for operating a directional antenna in a Wireless Local Area Network (WLAN), comprising:
    causing a Medium Access Control (MAC) layer to provide metrics associated with respective beam angles of the directional antenna, wherein causing the MAC layer to provide the metrics includes receiving a table of previously calculated metrics from the MAC layer; and
    based on the metrics, steering the directional antenna to a selected direction associated with an Access Point (AP).

2. The method according to claim 1 wherein causing the MAC layer to provide the metrics includes causing the MAC layer to determine the metrics as a function of received energy by the directional antenna in the beam angles.

3. The method according to claim 1 wherein causing the MAC layer to provide the metrics includes causing the MAC layer to transmit a signal to at least one access point and to measure a response from said at least one access point.

4. A method for operating a directional antenna in a Wireless Local Area Network (WLAN), comprising:
    causing a Medium Access Control (MAC) layer to provide metrics associated with respective beam angles of the directional antenna;
    based on the metrics, steering the directional antenna to a selected direction associated with an Access Point (AP), and causing the MAC layer to provide the metrics includes causing the MAC layer to calculate the metrics as a function of a beacon signal.

5. The method according to claim 1 further including associating with a distribution system coupled to the access point.

6. The method according to claim 5 wherein causing the MAC layer to provide the metrics occurs before or after associating with the distribution system.

7. The method according to claim 1 further including coordinating the beam angle of the directional antenna with causing the MAC layer to provide the metrics.

8. The method according to claim 1 wherein the beam angle includes an omni-directional beam angle.

9. The method according to claim 1 wherein the metrics correspond to beam angles relative to one access point.

10. The method according to claim 1 wherein the metrics correspond to beam angles relative to multiple access points.

11. The method according to claim 1 wherein the metrics includes at least one of the following: Signal-To-Noise Ratio (SNR), Energy-per-bit per total Noise (Eb/No), Received Signal Strength Indication (RSSI), and Carrier-to-Interference Ratio (C/I).

12. The method according to claim 1 used in an 802.11, 802.11a, 802.11b, or 802.11g network.

13. An apparatus for operating a directional antenna in a Wireless Local Area Network (WLAN), comprising:
    a Station Management Entity (SME) that causes a Medium Access Control (MAC) layer to provide metrics associated with respective beam angles of the directional antenna; and
    an antenna control unit coupled to the directional antenna that receives input based on the metrics from the SME and, in turn, causes the directional antenna to steer an antenna beam to a selected direction associated direction associated with an Access Point (AP).

14. The apparatus according to claim 13 wherein the SME causes the MAC layer to determine the metrics as a function of received energy by the directional antenna in the beam angles.

15. The apparatus according to claim 13 wherein the SME causes the MAC layer to transmit a signal to the access point and to measure a response from the access point.

16. The apparatus according to claim 13 further including a table of previously calculated metrics, wherein the table is provided from the MAC layer to the SME.

17. An apparatus for operating a directional antenna in a Wireless Local Area Network (WLAN), comprising:
- a Station Management Entity (SME) that causes a Medium Access Control (MAC) layer to provide metrics associated with respective beam angles of the directional antenna; and
- an antenna control unit coupled to the directional antenna that receives input based on the metrics from the SME and, in turn, causes the directional antenna to steer an antenna beam to a selected direction associated direction associated with an Access Point (AP), the SME causing the MAC layer to calculate the metrics as a function of a beacon signal.

18. The apparatus according to claim 13 wherein the SME associates with a distribution system coupled to the AP.

19. The apparatus according to claim 18 wherein the SME causes the MAC layer to provide the metrics before or after associating with the distribution system.

20. The apparatus according to claim 13 wherein the SME coordinates the beam angle of the directional antenna with causing the MAC layer to provide the metrics.

21. The apparatus according to claim 13 wherein the SME causes the directional antenna to operate in an omni-directional beam angle mode.

22. The apparatus according to claim 13 wherein the metrics correspond to beam angles relative to one access point.

23. The apparatus according to claim 13 wherein the metrics correspond to beam angles relative to multiple access points.

24. The apparatus according to claim 13 wherein the metrics include at least one of the following: Signal-to-Noise Ratio (SNR), Energy-per-Bit per Total Noise (Eb/No), Received Signal Strength Indication (RSSI), and Carrier-to-Interference Ratio (C/I).

25. The apparatus according to claim 13 used in an 802.11, 802.11a, 802.11b, or 802.11g network.

26. A method for operating a directional antenna in a Wireless Local Area Network (WLAN), comprising:
- causing a Medium Access Control (MAC) layer to provide metrics associated with respective beam angles of the directional antenna, the Medium Access Control layer accessing metrics from a look up table stored in memory or the Medium Access Control layer calculating metrics, the Medium Access Control layer communicating the metrics to the directional antenna in packets through the Wireless Local Area Network, the communication being configured to cycle through a plurality of antenna positions and provide metrics associated with each of the plurality of antenna position to determine a predetermined antenna position; and
- based on the metrics, steering the directional antenna to a selected direction associated with an Access Point (AP).

* * * * *

UNITED STATES PATENT AND TRADEMARK OFFICE
CERTIFICATE OF CORRECTION

PATENT NO. : 7,212,499 B2 Page 1 of 1
APPLICATION NO. : 10/675563
DATED : May 1, 2007
INVENTOR(S) : Hoffmann et al.

It is certified that error appears in the above-identified patent and that said Letters Patent is hereby corrected as shown below:

ON THE FACE PAGE

In the representative figure, delete notation "110b" and insert therefor --120b--.

IN THE DRAWINGS

FIG. 1A, delete notation "125" and insert therefor --105--.

FIG. 1B, delete notation "110b" and insert therefor --120b--.

FIG. 4, at element "417", upper left corner, line 1, before the word "USES", delete "SMC" and insert therefor --SME--.

IN THE SPECIFICATION

Column 6, line 8, after the word "convert", delete "and" and insert therefor --an--.

IN THE CLAIMS

Claim 13, column 10, lines 56 & 57, after the word "direction", delete "associated direction".

Claim 17, column 11, lines 10 & 11, after the word "direction", delete "associated direction".

Claim 26, column 12, line 22, after the word "antenna", delete "position" and insert therefor --positions--.

Signed and Sealed this

Fifteenth Day of January, 2008

JON W. DUDAS
*Director of the United States Patent and Trademark Office*